(12) United States Patent
Yoneda et al.

(10) Patent No.: US 10,761,411 B2
(45) Date of Patent: Sep. 1, 2020

(54) IMAGING APPARATUS WITH USER HOLDABLE GRIP

(71) Applicant: SONY CORPORATION, Tokyo (JP)

(72) Inventors: Naofumi Yoneda, Tokyo (JP); Tatsuya Nishiyama, Kanagawa (JP); Kenji Himeno, Kanagawa (JP); Jun Ishida, Kanagawa (JP); Akihiro Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 15/505,206

(22) PCT Filed: Aug. 11, 2015

(86) PCT No.: PCT/JP2015/004024
§ 371 (c)(1),
(2) Date: Feb. 20, 2017

(87) PCT Pub. No.: WO2016/031160
PCT Pub. Date: Mar. 3, 2016

(65) Prior Publication Data
US 2017/0255084 A1   Sep. 7, 2017

(30) Foreign Application Priority Data

Aug. 29, 2014   (JP) .................................. 2014-175295

(51) Int. Cl.
*G03B 17/56* (2006.01)
*H04N 5/225* (2006.01)
(Continued)

(52) U.S. Cl.
CPC ......... *G03B 17/563* (2013.01); *F16M 11/105* (2013.01); *F16M 11/2092* (2013.01);
(Continued)

(58) Field of Classification Search
CPC .... G03B 17/563; G03B 17/561; G03B 17/00; G03B 17/02; F16M 13/022; F16M 13/04;
(Continued)

(56) References Cited

U.S. PATENT DOCUMENTS

| | | | |
|---|---|---|---|
| 4,943,820 A | 7/1990 | Larock | |
| 6,317,155 B1 * | 11/2001 | Ohyama | G03B 27/52 348/373 |

(Continued)

FOREIGN PATENT DOCUMENTS

| | | |
|---|---|---|
| EP | 0919764 A2 | 6/1999 |
| EP | 1901548 A2 | 3/2008 |

(Continued)

OTHER PUBLICATIONS

Screen shot of Epson Document Camera, https://www.youtube.com/watch?v=k11DryEbaWQ, Published Mar. 17, 2012, retrieved on Nov. 13, 2018. (Year: 2012).*

*Primary Examiner* — Albert H Cutler
(74) *Attorney, Agent, or Firm* — Chip Law Group

(57) ABSTRACT

An imaging apparatus including a main unit, a grip, and an arm. The main unit includes an imaging device and imaging lens. The grip is configured to be gripped by a user. The arm includes a first attaching portion and a second attaching portion. The grip is attached to the first attaching portion, and the second attaching portion is attached to the main unit of the imaging apparatus. A position of the grip is adjustable, with respect to the main unit, about the second attaching portion. Further, an orientation of the grip is adjustable, with respect to the main unit, about the first attaching portion of the arm.

13 Claims, 16 Drawing Sheets

(51) Int. Cl.
   *F16M 11/10*      (2006.01)
   *F16M 11/20*      (2006.01)
   *F16M 13/02*      (2006.01)
   *H04N 5/232*      (2006.01)
   *F16M 13/04*      (2006.01)

(52) U.S. Cl.
   CPC .......... *F16M 13/022* (2013.01); *F16M 13/04* (2013.01); *H04N 5/2251* (2013.01); *H04N 5/23245* (2013.01); *H04N 5/23293* (2013.01)

(58) Field of Classification Search
   CPC ........... H04N 5/23293; H04N 5/23245; H04N 5/2252
   USPC ........................... 396/12, 419, 420, 424, 428
   See application file for complete search history.

(56) References Cited

U.S. PATENT DOCUMENTS

| | | | | |
|---|---|---|---|---|
| 2005/0157198 | A1* | 7/2005 | Larner | H04N 5/23212 348/345 |
| 2005/0253960 | A1* | 11/2005 | Nakamura | H04N 5/2251 348/373 |
| 2007/0052836 | A1* | 3/2007 | Yamada | H04N 5/23212 348/345 |
| 2009/0002548 | A1* | 1/2009 | Liang | H04N 1/00519 348/373 |
| 2009/0003822 | A1* | 1/2009 | Tyner | F16M 11/32 396/428 |
| 2009/0059064 | A1 | 3/2009 | Terakado | |
| 2010/0266270 | A1* | 10/2010 | Pizzo | G03B 17/00 396/420 |
| 2011/0019109 | A1* | 1/2011 | Maeda | G03B 21/00 348/745 |
| 2014/0341556 | A1* | 11/2014 | Kestermann | G03B 17/561 396/419 |

FOREIGN PATENT DOCUMENTS

| | | |
|---|---|---|
| JP | 2006-128847 A | 5/2006 |
| JP | 2012-095028 A | 5/2012 |

* cited by examiner

IMAGING APPARATUS WITH USER HOLDABLE GRIP

CROSS REFERENCE TO RELATED APPLICATIONS

This application is a U.S. National Phase of International Patent Application No. PCT/JP2015/004024 filed on Aug. 11, 2015, which claims priority benefit of Japanese Patent Application No. JP 2014-175295 filed in the Japan Patent Office on Aug. 29, 2014. Each of the above-referenced applications is hereby incorporated herein by reference in its entirety.

TECHNICAL FIELD

This technology relates to an imaging apparatus, and aims to increase operability and facilitate stable imaging, regardless of types of usage.

BACKGROUND ART

A conventional imaging apparatus, such as a professional video camera to be used in producing a video film or the like, is relatively large in size and is heavy. In view of this, PTL 1 discloses the provision of a shoulder pad on the bottom surface of an imaging apparatus so that the imaging apparatus can be carried on a person's shoulder at the time of imaging. Since such an imaging apparatus has a heavy lens at its front portion, a grip unit is provided at the lens so that stable imaging can be performed.

CITATION LIST

Patent Literature

[PTL 1]
JP 2012-95028 A

SUMMARY

Technical Problem

An imaging apparatus is not necessarily carried on a shoulder when being used, but, in some cases, preferably performs imaging while not being carried on a shoulder, depending on the location of the object or desired composition. However, for an imaging apparatus that is designed to be carried on a shoulder when being used, it is difficult to perform stable imaging while not being carried on a shoulder.

In view of the above, this technology provides an imaging apparatus that can increase operability and facilitate stable imaging, regardless of types of usage.

Solution to Problem

According to one aspect of this technology, an imaging apparatus includes a main unit, a grip, and an arm. The main unit includes an imaging device and imaging lens. The grip is configured to be gripped by a user. The arm includes a first attaching portion and a second attaching portion, the grip being attached to the first attaching portion, and the second attaching portion being attached to the main unit of the imaging apparatus. A position of the grip is adjustable, which respect to the main unit, about the second attaching portion. Further, an orientation of the grip is adjustable, with respect to the main unit, about the first attaching portion of the arm.

According to another aspect of this technology, a supporting assembly includes a grip and an arm. The grip is configured to be gripped by a user. The arm includes a first attaching portion and a second attaching portion, the grip being attached to the first attaching portion, and the second attaching portion being configured to attach to an apparatus. A position of the grip is adjustable, with respect to the apparatus, about the second attaching portion. Further, an orientation of the grip is adjustable, with respect to the apparatus, about the first attaching portion of the arm.

Advantageous Effects of Invention

According to this technology, a grip configured to be gripped by a user, and an arm that includes a first attaching portion and a second attaching portion are provided, the grip being attached to the first attaching portion, and the second attaching portion being attached to an apparatus. Also, a position of the grip is adjustable, with respect to the apparatus, about the second attaching portion, and an orientation of the grip is adjustable, with respect to the apparatus, about the first attaching portion of the arm. Accordingly, stable imaging can be readily performed, regardless of types of usage. The advantageous effects described in this specification are merely examples, and the advantageous effects of the present technology are not limited to them and may include additional effects.

DESCRIPTION OF EMBODIMENTS

The following is a description of embodiments for carrying out the present technology. Explanation will be made in the following order.

1. Entire structure of an imaging apparatus
1-1. External structure of an imaging apparatus
1-2. Functional structure of the imaging apparatus
2. Structure and operation of the movable grip unit
3. Structure and operation of the viewfinder holding unit
4. Usage of the imaging apparatus <1. Entire Structure of an Imaging Apparatus>
<1-1. External Structure of an Imaging Apparatus>

Figure 1:
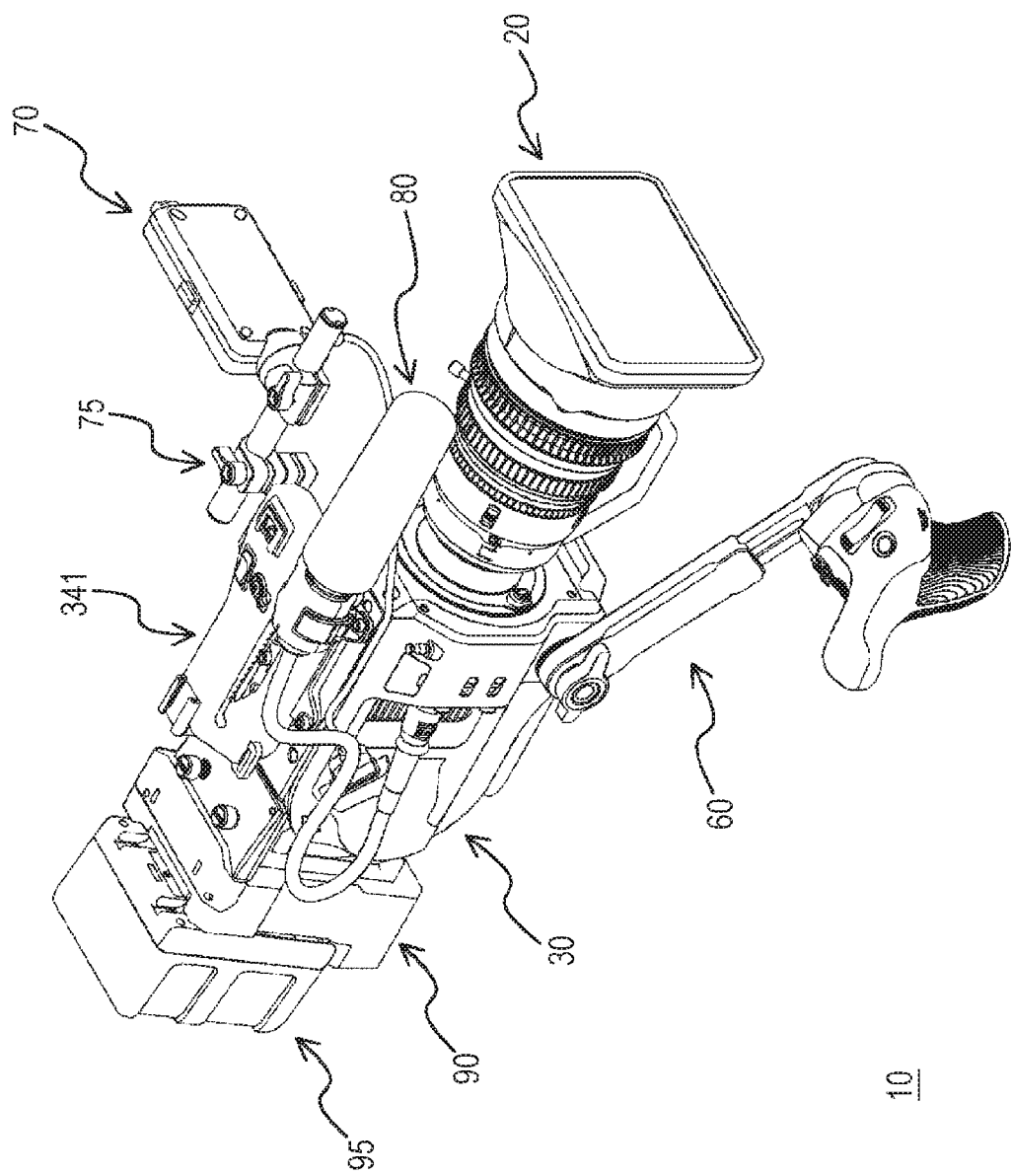
FIG. 1 is a perspective view of an imaging apparatus seen from the right front.
Figure 2:
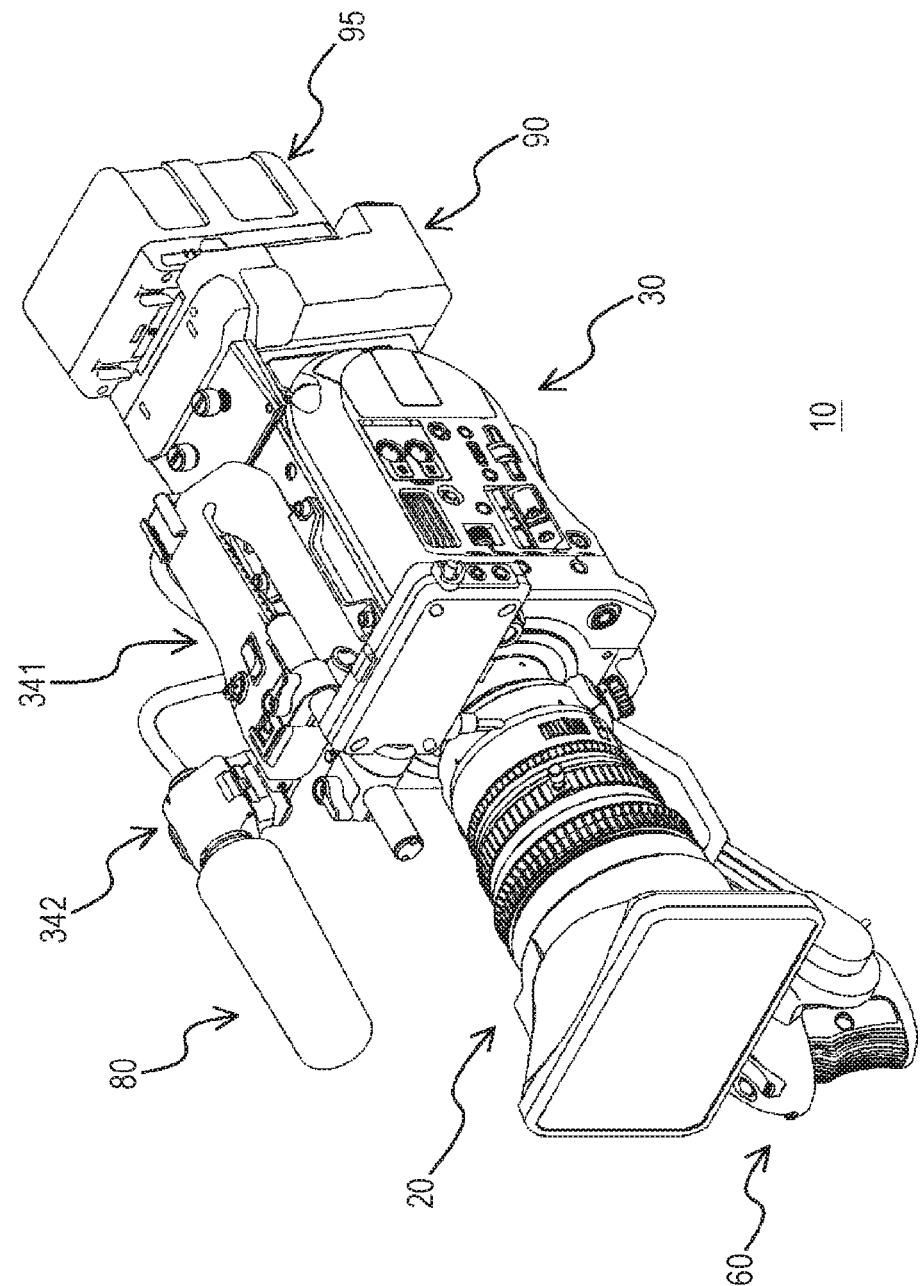
FIG. 2 is a perspective view of the imaging apparatus seen from the left front.
Figure 3:
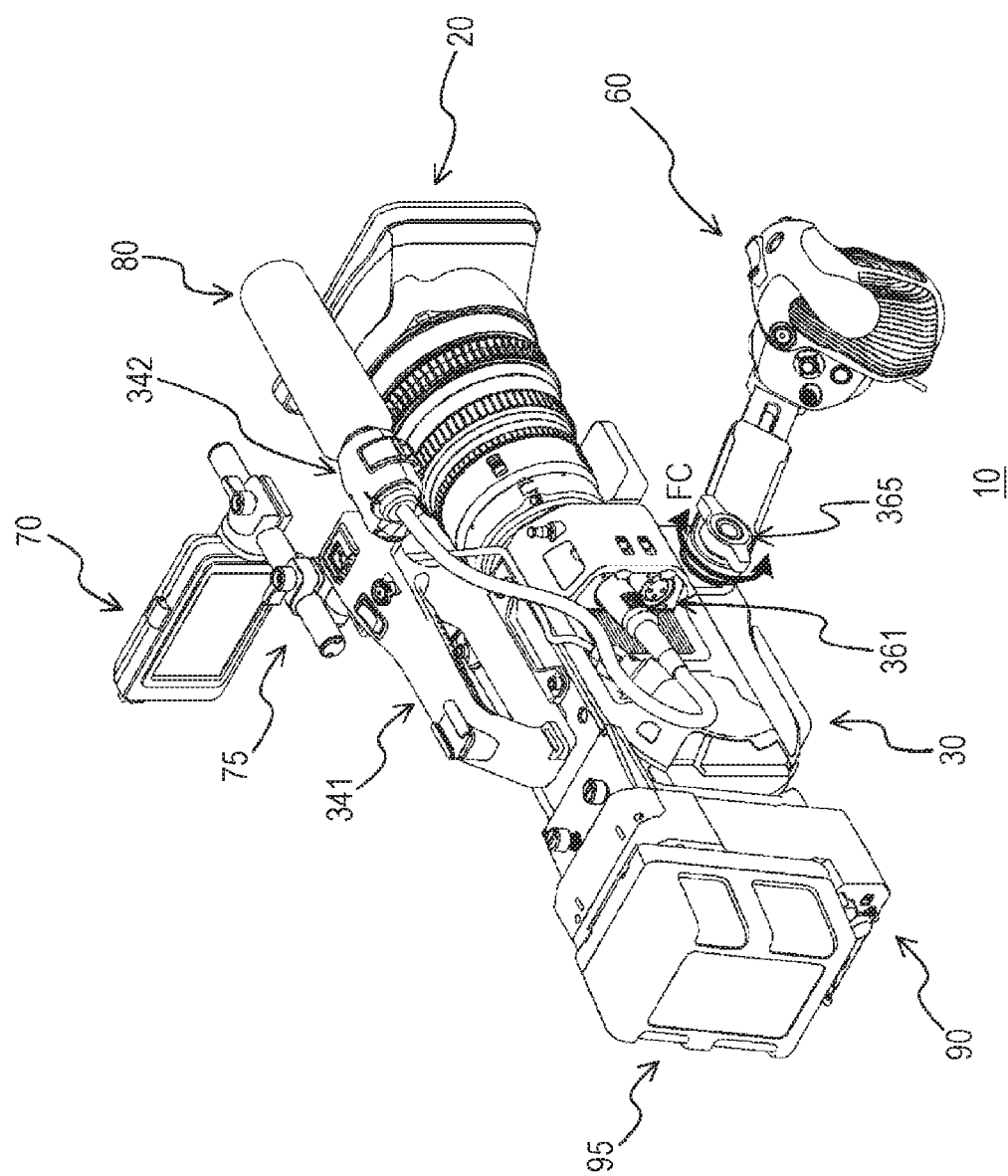
FIG. 3 is a perspective view of the imaging apparatus seen from the right rear.
Figure 4:
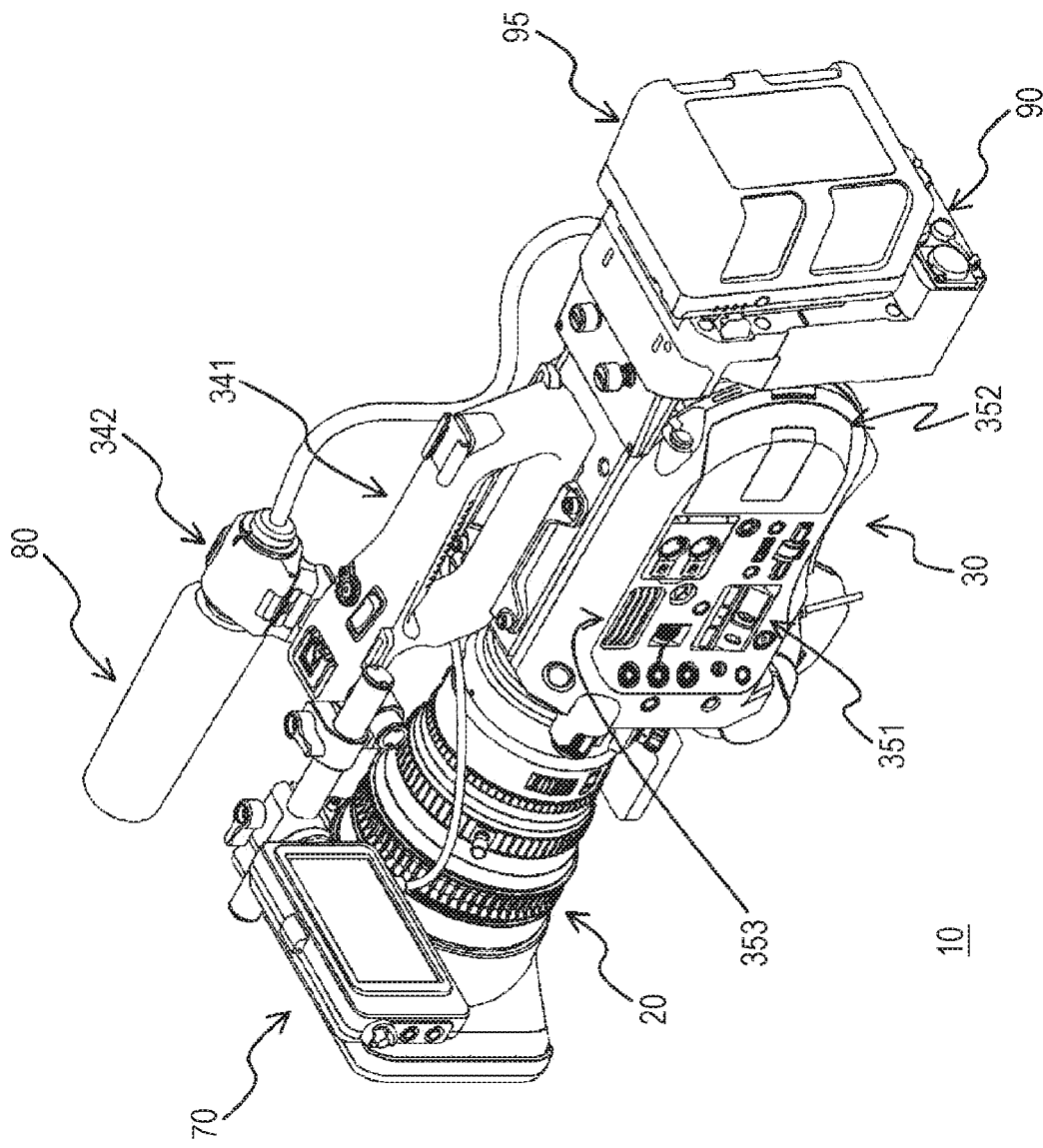
FIG. 4 is a perspective view of the imaging apparatus seen from the left rear.
Figure 5:
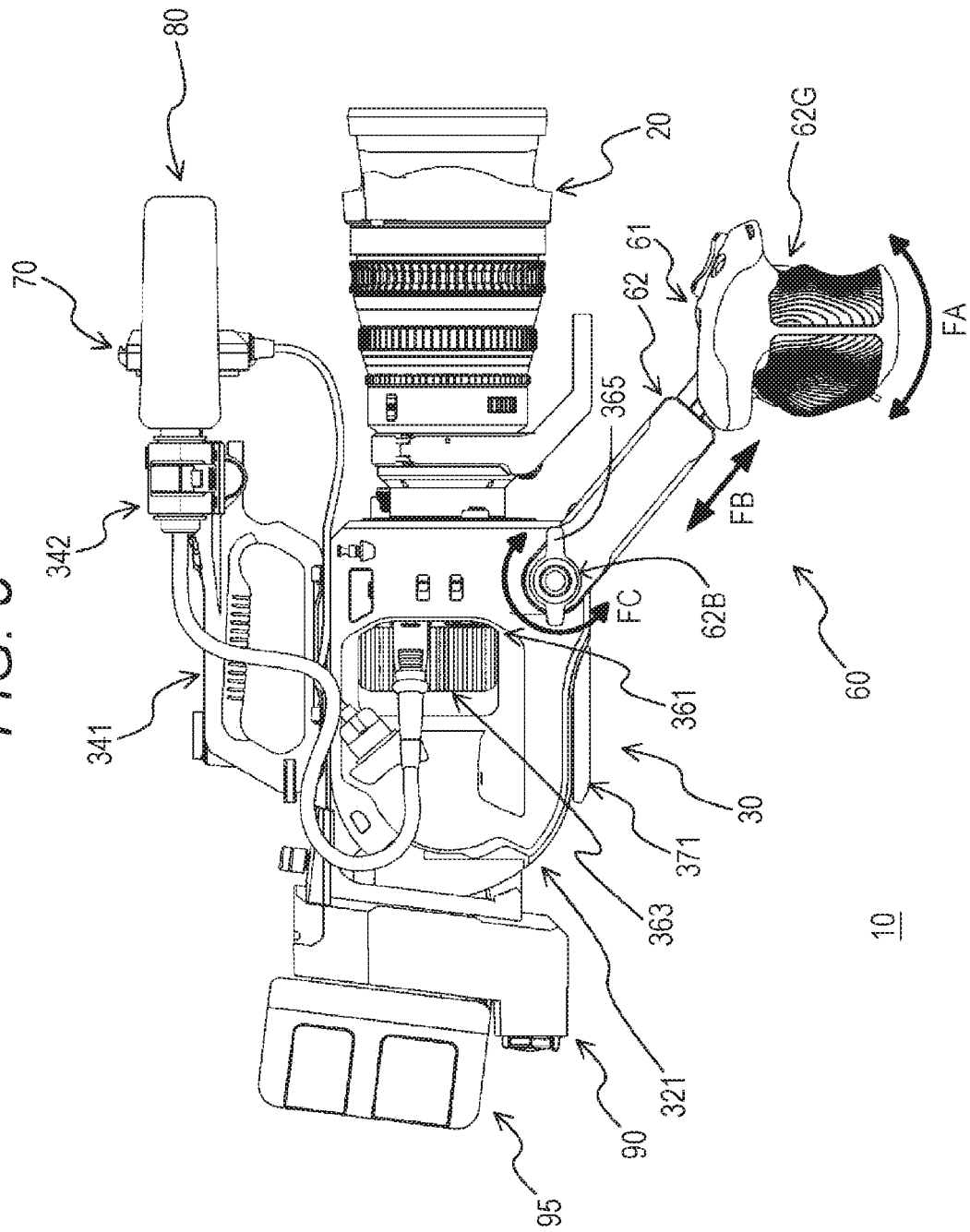
FIG. 5 is a right side view of the imaging apparatus.
Figure 6:
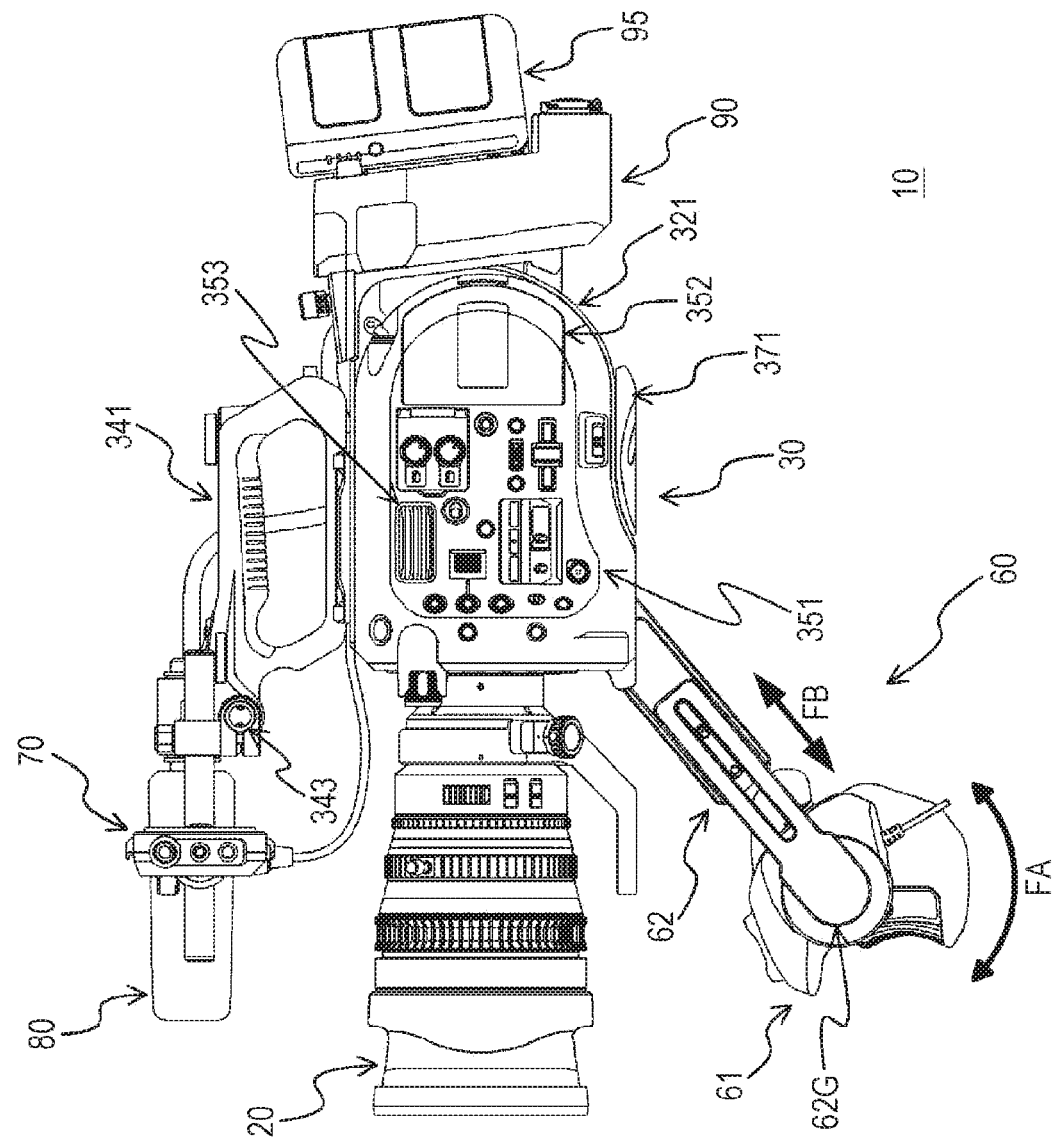
FIG. 6 is a left side view of the imaging apparatus.
Figure 7:
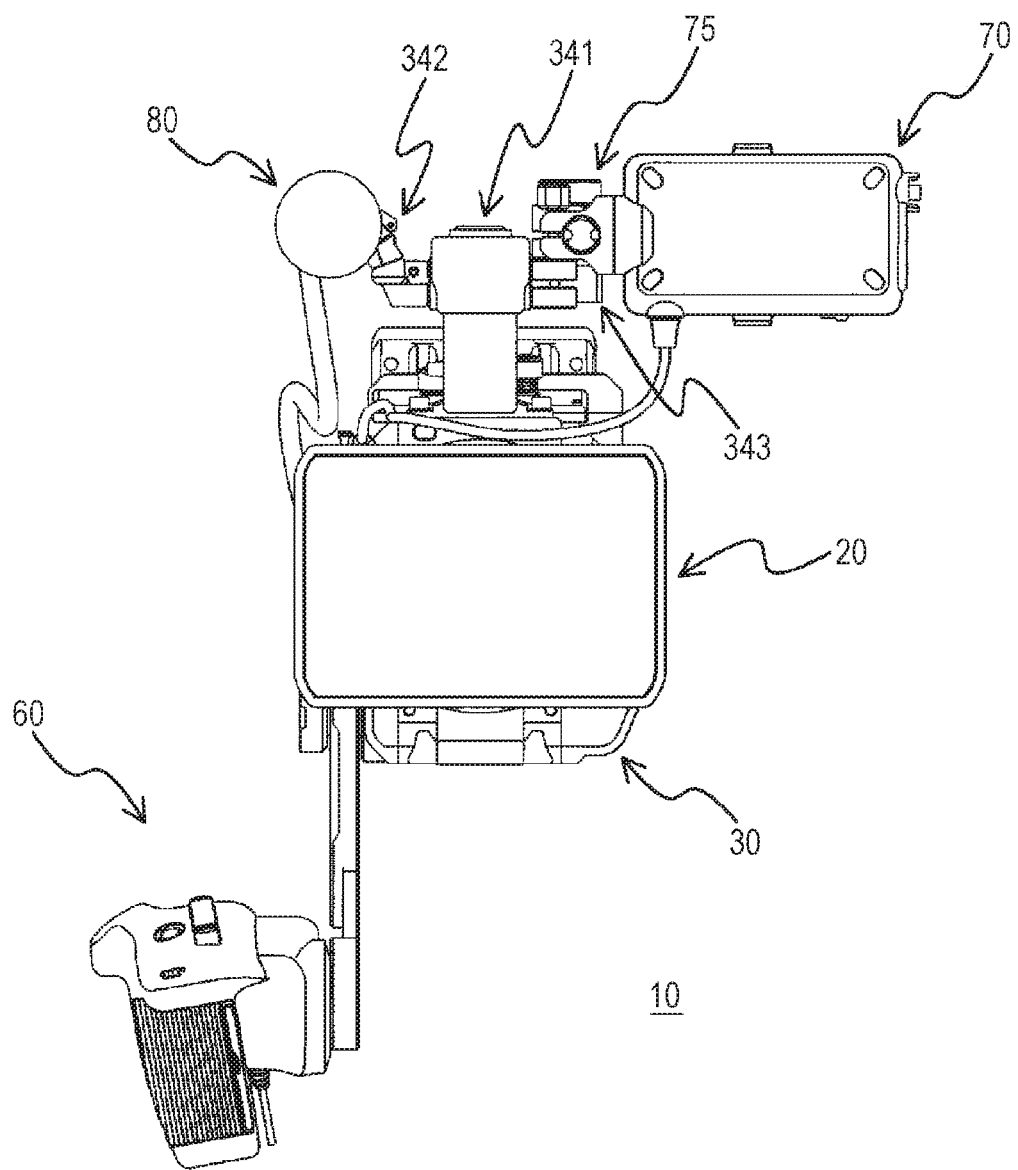
FIG. 7 is a front view of the imaging apparatus.
Figure 8:
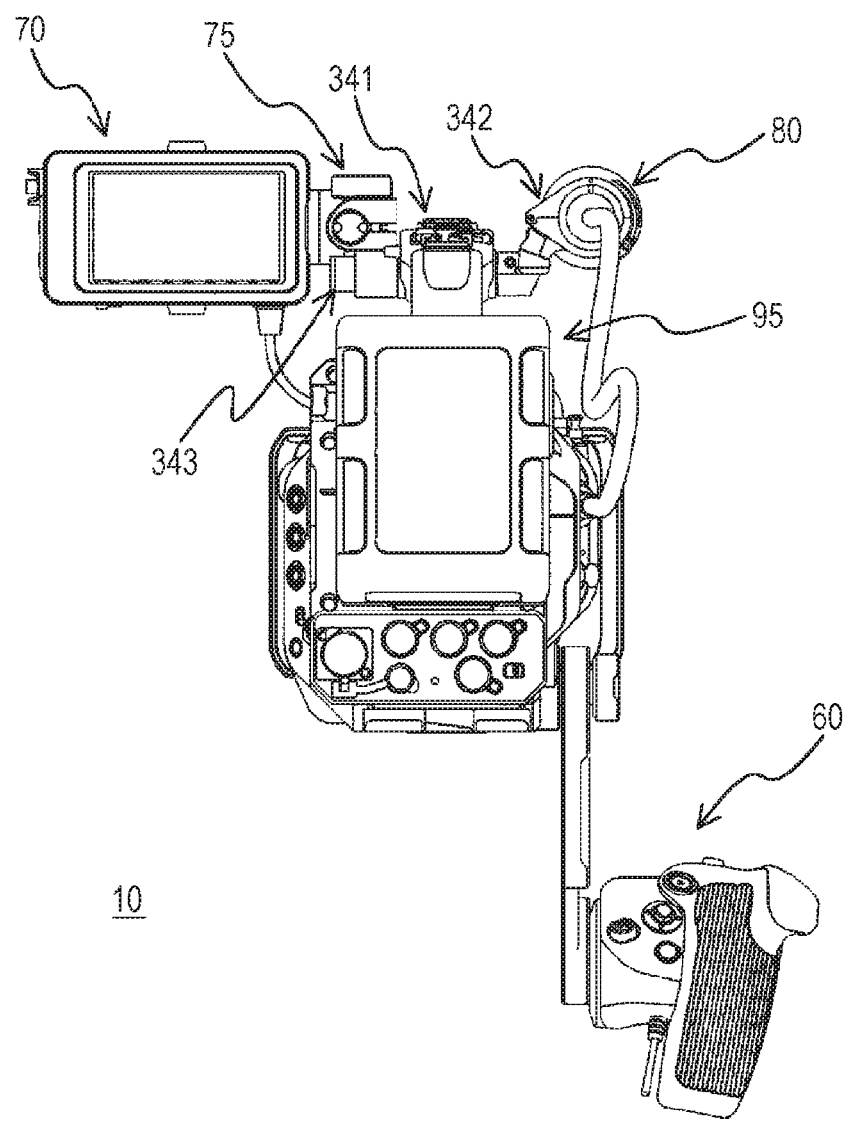
FIG. 8 is a rear view of the imaging apparatus.
Figure 9:
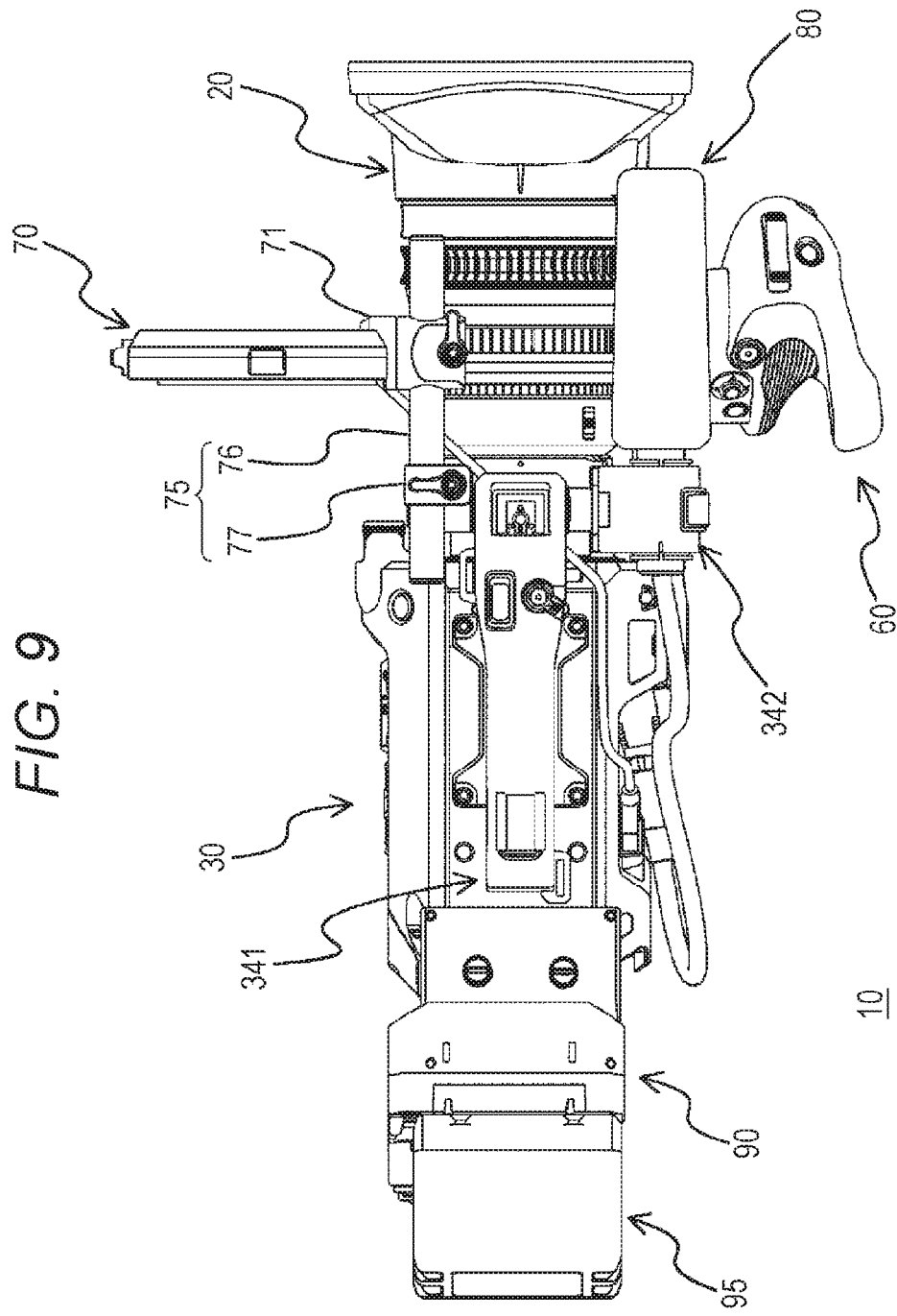
FIG. 9 is a plan view of the imaging apparatus.
Figure 10:
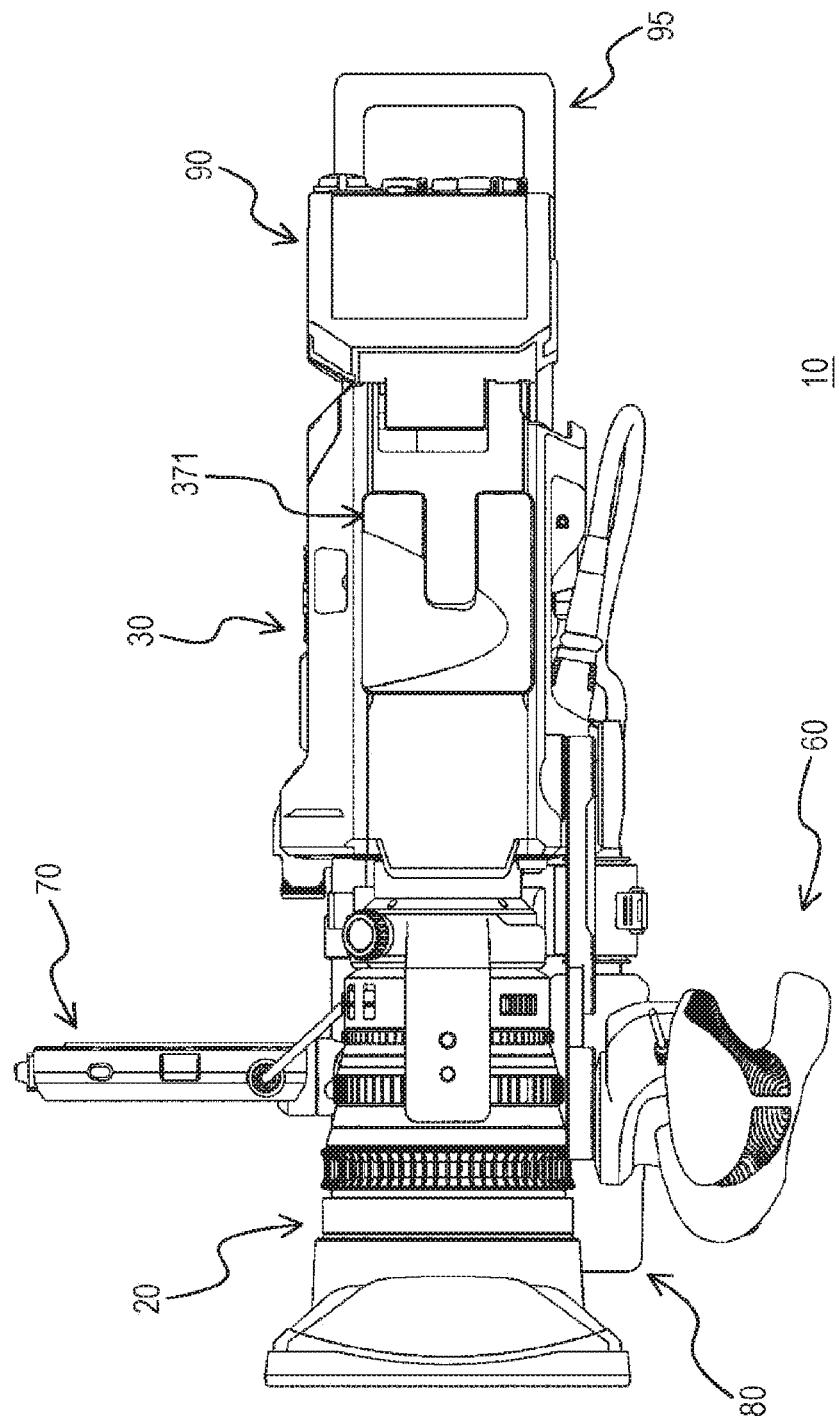
FIG. 10 is a bottom view of the imaging apparatus.

FIGS. 1 through 10 show examples of exteriors of an imaging apparatus of the present technology. FIG. 1 is a perspective view of the imaging apparatus seen from the right front. FIG. 2 is a perspective view of the imaging apparatus seen from the left front. FIG. 3 is a perspective view of the imaging apparatus seen from the right rear. FIG. 4 is a perspective view of the imaging apparatus seen from the left rear. FIG. 5 is a right side view of the imaging apparatus. FIG. 6 is a left side view of the imaging apparatus. FIG. 7 is a front view of the imaging apparatus. FIG. 8 is a rear view of the imaging apparatus. FIG. 9 is a plan view of the imaging apparatus. FIG. 10 is a bottom view of the imaging apparatus.

The imaging apparatus 10 shown in FIGS. 1 through 10 includes a lens unit 20, a main unit 30, a movable grip unit 60, a viewfinder unit 70, a microphone 80, and adapters 90 and 95. It should be noted that the lens unit 20, the movable grip unit 60, the viewfinder unit 70, the microphone 80, and the adapters 90 and 95 may be designed to be detachable from the main unit 30, and be provided separately from the main unit 30.

The lens unit 20 is attached to the front surface of the main unit 30. The lens unit 20 includes an imaging lens that gathers light from an object, and a zoom mechanism that changes the optical magnification of the imaging lens within a predetermined range.

The main unit 30 has a cylindrical shape in the optical-axis direction of the lens unit 20, having a side surface protruding outward. For example, the main unit 30 has a side surface protruding outward, to have a cylindrical shape that is substantially octagonal in cross-section in a direction perpendicular to the optical-axis direction. In side views, a chamfered sloping portion is formed at a lower portion of the rear end of the main unit 30. For example, as shown in FIGS. 5 and 6, a chamfered sloping portion 321 having an arc-like curved edge portion is formed in the imaging apparatus 10.

Although not shown in the drawings, a battery mounting portion, an adapter mounting portion, and the like are provided on the rear surface of the main unit 30. The battery for supplying the necessary power for operating the imaging apparatus 10 is attached to the battery mounting portion. The adapter 90 can be attached to the adapter mounting portion.

A handle unit 341 is formed on the upper surface of the main unit 30. The handle unit 341 is designed to be grabbed with a hand of a user to hold the imaging apparatus 10 when the user is carrying around the imaging apparatus 10 or uses the imaging apparatus 10 in a low position. A microphone attaching portion 342 is provided on one of the side surfaces on the front end side of the handle unit 341 (or the surface on the opposite side from the user side in a case where the imaging apparatus 10 is carried on a shoulder when being used), and a support shaft 343 for holding the viewfinder unit 70 protrudes from the other one of the side surfaces (or the user-side surface in a case where the imaging apparatus 10 is carried on a shoulder when being used). The microphone 80 is attached to the front surface of the microphone attaching portion 342.

As shown in FIGS. 4 and 6, an operating unit 351, a recording medium mounting portion 352, a suction port 353, and the like are provided on one of the side surfaces of the main unit 30, or the side surface supposed to face the face of the user in a case where the imaging apparatus 10 is carried on a shoulder when being used, for example. The operating unit 351 is located at the middle portion of the side surface, and the recording medium mounting portion 352 is located at a rear portion of the side surface. The suction port 353 is located at the middle portion of the side surface and an upper portion of the main unit 30.

The operating unit 351 includes operating switches and the like for performing various settings of the imaging apparatus 10. The recording medium mounting portion 352 is used when a recording medium on which information signals like video signals and audio signals are recorded, such as a memory card formed with a semiconductor memory like a flash memory, is mounted on the main unit 30. The suction port 353 is part of the heat release mechanism of the main unit 30, and the external air is introduced through the suction port 353. The suction port 353 is designed to have slit-like openings in a rectangular region, for example.

As shown in FIGS. 3 and 5, a connecting terminal portion 361, an exhaust port 363, and the like are provided on the other side surface of the main unit 30. A concave portion that has a rectangular shape minus a side in a plan view is formed at the middle portion of the other side surface. The connecting terminal portion 361 is located on a side surface of the concave portion, and the exhaust port 363 is located on the bottom surface of the concave portion and at an upper portion of the main unit 30.

The connecting terminal portion 361 is formed with a terminal that connects to a signal cable for connecting the viewfinder unit 70 and the microphone 80 to the main unit 30, for example. The exhaust port 363 is part of the heat release mechanism of the main unit 30, and the external air introduced through the suction port 353 is released through the exhaust port 363. The exhaust port 363 is designed to have slit-like openings in a rectangular region, for example.

The movable grip unit 60 for supporting the main unit 30 at the time of imaging or the like is attached to the other side surface of the main unit 30. The movable grip unit 60 is attached to the main unit 30 with a securing lever 365. When the securing lever 365 is loosened, the movable grip unit 60 can be rotated about the position of the securing lever 365 and be moved to a desired position, as indicated by the arrows FC. Further, when the securing lever 365 is tightened, the position of the movable grip unit 60 is fixed to the main unit 30. The movable grip unit 60 will be described later in detail.

A shoulder pad 371, a tripod attaching portion (not shown), and the like are provided on the bottom surface of the main unit 30. The shoulder pad 371 is provided at the portion to be in contact with a shoulder in a case where the imaging apparatus 10 is carried on the shoulder when being used. The shoulder pad 371 is made of a soft material and is designed to have a curved surface so that the user can easily carry the imaging apparatus 10 on his/her shoulder and the shoulder pad 371 can have cushioning characteristics. The tripod attaching portion has a screw hole for securing the main unit 30 to a tripod or the like.

The viewfinder unit 70 is attached to the support shaft 343 of the handle unit 341 via a viewfinder holding unit 75. The viewfinder unit 70 displays a through-the-lens image, an image recorded in a recording medium, a menu image, various kinds of information, or the like. The microphone 80 generates an audio signal by gathering external sound. The adapters 90 and 95 are adapters for enhancing a function or the like of the imaging apparatus 10. For example, the adapter 95 is an additional battery, and the adapter 90 connects the additional battery to the main unit 30. Since the adapters 90 and 95 are used for enhancing a function or the like of the imaging apparatus 10, imaging can be performed even if the adapters 90 and 95 are not attached to the imaging apparatus 10.

<1-2. Functional Structure of the Imaging Apparatus>

Figure 11:
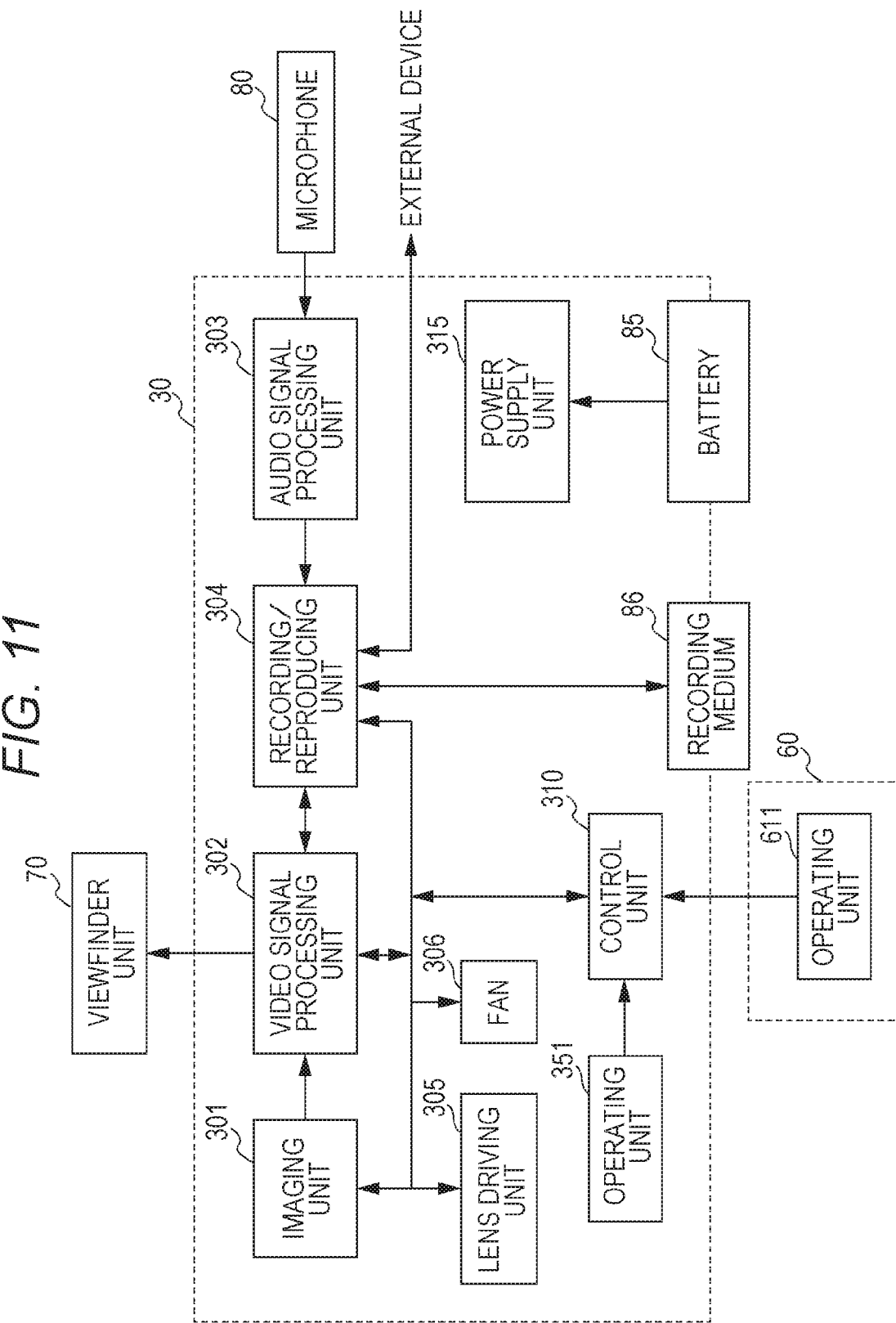
FIG. 11 is a functional block diagram of the imaging apparatus.

FIG. 11 is a functional block diagram of the imaging apparatus 10. The main unit 30 includes an imaging unit 301, a video signal processing unit 302, an audio signal processing unit 303, a recording/reproducing unit 304, a lens driving unit 305, a fan 306, an operating unit 351, a control unit 310, and a power supply unit 315.

The imaging unit 301 includes an imaging element such as a CMOS (complementary metal-oxide semiconductor device) or a CCD (Charge-Coupled Device). The imaging unit 301 photoelectrically converts an optical image that has been formed on the imaging plane by the lens unit 20, and generates and outputs an imaging signal to the video signal processing unit 302.

The video signal processing unit 302 performs a noise removal process, a gain adjustment process, and a luminance and color adjustment process on the imaging signal. The video signal processing unit 302 also performs the process of converting an adjusted video signal or a video signal read by the recording/reproducing unit 304 into a video signal corresponding to the number of pixels of the viewfinder unit 70, and the process of superimposing a display signal for menu display or the like on a video signal. The video signal processing unit 302 may also perform video image processing on a viewfinder image so as to readily obtain a desired image, such as the process of enlarging and displaying the middle portion. The video signal processing unit 302 outputs the processed video signal to the viewfinder unit 70.

The audio signal processing unit 303 performs the process of amplifying an audio signal generated by the microphone 80, for example, and outputs the audio signal to the recording/reproducing unit 304.

Based on an instruction from the control unit 310, the recording/reproducing unit 304 performs the process of recording information signals such as a video signal and an audio signal on a recording medium 86, and the process of reading and reproducing the information signals recorded on the recording medium 86. The recording/reproducing unit 304 also performs the process of supplying the video signal read from the recording medium 86 to the viewfinder unit 70 via the video signal processing unit 302, for example. The recording/reproducing unit 304 further performs the process of outputting the information signals in a predetermined format to an external device, for example. The recording medium 86 may be a detachable recording medium such as a recording medium inserted through the recording medium mounting portion 352 shown in FIGS. 4 and 6, or may be a recording medium secured to the inside of the main unit 30.

Based on an instruction from the control unit 310, the lens driving unit 305 drives the lens unit 20 and sets a desired zoom magnification. The lens driving unit 305 may also perform focus adjustment so that the optical image formed on the imaging plane of the imaging element in the imaging unit 301 becomes a clear image.

The fan 306 takes in the external air through the inlet port provided on one of the side surfaces of the main unit 30, and releases heated air through the exhaust port provided on the other one of the side surfaces of the main unit 30, so as to release the heat generated in the main unit 30 to the outside.

The operating unit 351 is provided on one of the side surfaces of the main unit 30 as shown in FIGS. 4 and 6, and includes operating switches. The operating unit 351 generates an operation signal in accordance with a switching operation of the user, and outputs the operation signal to the control unit 310.

An operating unit 611 includes operating switches formed on the grip main unit of the movable grip unit 60. The operating unit 611 generates an operation signal in accordance with a switching operation of the user, and outputs the operation signal to the control unit 310. The operating unit 611 also includes a fixed-function switch and/or a variable-function switch. For example, the operating unit 611 includes, as the fixed-function switch, a zoom switch for adjusting the focal length of the lens unit 20 and/or a REC switch for issuing an instruction to start or end recording. The operating unit 611 also includes an assignable button that is the variable-function switch, and a setting button or the like for assigning a function to the assignable button or changing the function assigned to the assignable button. The operating unit 611 may also include a power supply switch or the like.

Although not shown in the drawings, the control unit 310 includes a CPU (Central Processing Unit), an EEPROM (Electrically Erasable Programmable ROM), a ROM (Read Only Memory), and a RAM (Random Access Memory), for example. The ROM in the control unit 310 stores the program for the control unit 310 to perform various control processes. The CPU operates in accordance with the program, and performs the arithmetic and control processes necessary for control operations, using the RAM. The program may not be stored beforehand in the ROM in the main unit 30, but may be stored in a removable recording medium provided to the main unit 30, or be downloaded into the main unit 30 via a network such as a LAN or the Internet.

In accordance with a user operation involving the operating unit 351 or 611, the control unit 310 controls the respective components so that the imaging apparatus 10 performs the operation corresponding to the user operation. For example, the control unit 310 switches on and off the power supply to the imaging apparatus 10, in accordance with a user operation involving the power supply switch. The control unit 310 also controls the lens driving unit 305 in accordance with a user operation involving the zoom switch, to change the focal length of the lens unit 20 in accordance with the user operation. The control unit 310 also starts or stops information signal recording in accordance with a user operation involving the REC button.

In accordance with a user operation involving the assignable button, the control unit 310 also performs control to execute the function assigned to the operated assignable button. In accordance with a user operation involving the setting button, the control unit 310 further assigns a function to the assignable button. It is possible to assign a function for displaying various markers, a record review function, a viewfinder mode switch function, a viewfinder image switch function for facilitating focus adjustment, a luminance-related information display function, or the like to the assignable button.

The control unit 310 further controls the fan 306, to release the heat generated inside the main unit 30 to the outside.

The power supply unit 315 supplies power from a battery 85 mounted on the main unit 30 to the respective components of the imaging apparatus 10. In a case where an additional battery is attached to the main unit 30, the power supply unit 315 also supplies power from this additional battery.

<2. Structure and Operation of the Movable Grip Unit>

Figure 12:
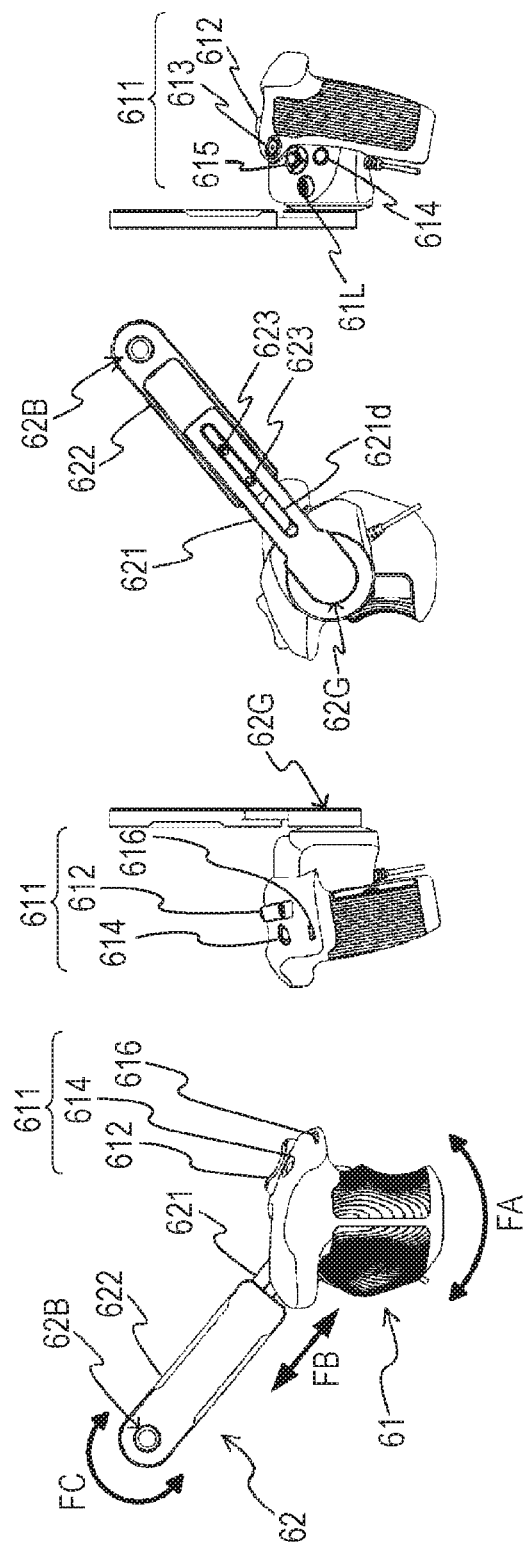
FIGS. 12(A) through 12(D) are diagrams showing the structure of a movable grip unit.

FIGS. 12(A) through 12(D) show an example structure of the movable grip unit. FIG. 12(A) is a view of the movable grip unit seen from the right side of the imaging apparatus, for example. FIG. 12(B) is a view of the movable grip unit seen from the front side of the imaging apparatus, for example. FIG. 12(C) is a view of the movable grip unit seen from the left side of the imaging apparatus, for example. FIG. 12(D) is a view of the movable grip unit seen from the back side of the imaging apparatus, for example.

The movable grip unit 60 includes a grip main unit 61 and an arm unit 62. The grip main unit 61 is the portion to be gripped by the user, and has such a shape that the user can easily grip the grip main unit 61 in a predetermined positional relationship with a hand of the user. The grip main unit 61 includes the operating switches that form the operating unit 611 in such positions that the operating switches can be operated while the user is gripping the grip main unit 61. The operating unit 611 includes a switch for adjusting the focal length and/or a switch for issuing an instruction to start or end recording. For example, in FIGS. 12(A) through 12(D), a zoom switch 612 for adjusting the focal length and a REC button 613 for issuing an instruction to start or end recording are provided as operating switches. The operating unit 611 further includes a fixed-function switch and/or a variable-function switch. For example, in FIGS. 12(A) through 12(D), an assignable button 614 that is the variable-function switch, a setting button 615 for assigning a function to the assignable button 614 or changing the function assigned to the assignable button 614, and a jog dial 616 for selecting a function or the like are provided as operating switches.

The grip main unit 61 also includes an unlocking button 61L that makes the grip main unit 61 movable in a desirable direction from the fixed position with respect to the arm unit 62. That is, the grip main unit 61 can be secured to a desired position while attached to the arm unit 62.

The grip main unit 61 is attached to a first attaching portion 62G formed at one end of the arm unit 62, and a second attaching portion 62B formed at the other end of the arm unit 62 is attached to the main unit 30. The arm unit 62 is attached in such a manner that the position of the grip main unit 61 with respect to the main unit 30 can be moved about the second attaching portion 62B, and the grip main unit 61 is attached in such a manner that the orientation thereof with respect to the main unit 30 can be moved about the first attaching portion 62G of the arm unit 62. A securing lever is provided at the second attaching portion 62B of the arm unit 62 as shown in FIG. 5, and the arm unit 62 can be secured to a desired position while attached to the main unit 30. For example, the arm unit 62 is attached to the main unit 30 so that the arm unit 62 can rotate about the second attaching portion 62B in the directions indicated by the arrows FC in FIG. 5, and the rotation plane of the arm unit 62 is substantially parallel to the side surface of the main unit 30. Further, the arm unit 62 is designed to be stretchable so that the distance between the first attaching portion 62G and the second attaching portion 62B can be changed.

For example, the arm unit 62 includes a rod 621 and a rod holding portion 622 that holds the rod 621 in a stretchable manner.

The first attaching portion 62G is formed at one end of the rod 621, and the other end of the rod 621 is housed in the rod holding portion 622. The grip main unit 61 is attached to the first attaching portion 62G in such a manner that the grip main unit 61 can rotate in the directions indicated by the arrows FA and can be secured to a desired rotational position. Also, the rod 621 is designed to be secured to the rod holding portion 622 at a desired stretched location. For example, a long hole 621*d* is formed in the rod 621, and a locking pin 623 formed on the rod holding portion 622 is inserted into the long hole 621*d*. A locking screw (not shown) provided at the top edge of the locking pin 623 is tightened, to secure the rod 621 to the rod holding portion 622. As the locking screw is loosened, the rod 621 can slide along the rod holding portion 622, and the distance between the first attaching portion 62G and the second attaching portion 62B can be adjusted. That is, the distance between the second attaching portion 62B of the arm unit 62 and the grip main unit 61 can be fixed to a desired distance. The distance between the first attaching portion 62G and the second attaching portion 62B can be adjusted within the range from the point where the locking pin 623 is in contact with one end of the long hole 621*d* and the point where the locking pin 623 is in contact with the other end of the long hole 621*d*.

<3. Structure and Operation of the Viewfinder Holding Unit>

The viewfinder holding unit 75 for attaching the viewfinder unit 70 to the main unit 30 includes a support shaft 76 and a clamp portion 77, as shown in FIG. 9. One end of the support shaft 76 is attached to the clamp portion 77, and the other end of the support shaft 76 is attached to a clamp portion 71 formed on a side surface of the viewfinder unit 70. The clamp portion 71 is designed to hold the viewfinder unit 70 in a rotatable manner about a direction perpendicular to the support shaft 76 inserted into the clamp portion 71.

Figure 13:
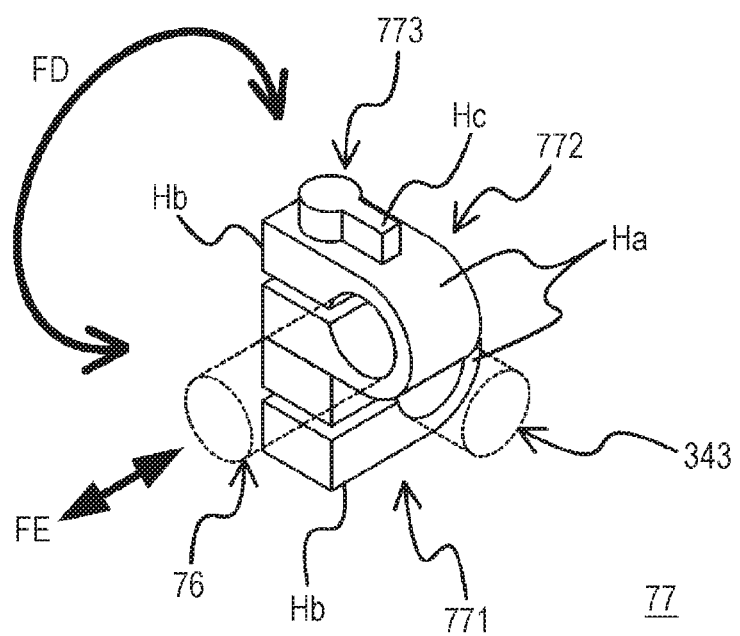
FIG. 13 is a diagram showing the structure of a clamp portion.

FIG. 13 shows an example structure of the clamp portion 77. The clamp portion 77 includes a first holding portion 771 that holds the inserted support shaft 343, and a second holding portion 772 that holds the support shaft 76 in the direction perpendicular to the support shaft 343. The first holding portion 771 and the second holding portion 772 each include a shaft supporting portion Ha that has an arc-like shape when seen from the shaft inserting direction, and a tightening portion Hb extending outward from the shaft supporting portion Ha. The tightening portions Hb of the first holding portion 771 and the second holding portion 772 are overlapped in directions perpendicular to each other. A through hole (not shown) is formed in each tightening portion Hb, for example, and the shaft of a securing lever portion 773 is inserted into the through holes of the tightening portion Hb of the first holding portion 771 and the second holding portion 772. An operating lever Hc is formed at one end of the shaft of the securing lever portion 773, and the other end of the securing lever portion 773 is secured to the tightening portion Hb. When the operating lever Hc is rotated in the tightening direction, the gap in the tightening portion Hb of the first holding portion 771 and the gap in the tightening portion Hb of the second holding portion 772 are both narrowed. As a result, the support shaft 343 is secured by the shaft supporting portion Ha of the first holding portion 771, and the support shaft 76 is secured by the shaft supporting portion Ha of the second holding portion 772. When the operating lever Hc is rotated in the loosening direction (the direction opposite from the tightening direction), the gap in the tightening portion Hb of the first holding portion 771 and the gap in the tightening portion Hb of the second holding portion 772 are both widened. As a result, the clamp portion 77 can be rotated about the support shaft 343 as indicated by arrows FD, and the support shaft 76 can be inserted to or detached from the first holding portion 771 as indicated by arrows FE. Therefore, if the operating lever Hc is rotated in the loosening direction, the support shaft 76 can be moved about the support shaft 343 and be adjusted to a desired orientation with respect to the main unit 30. Also, the distance from the support shaft 343 of the main unit 30 to the viewfinder unit 70 can be adjusted to a desired distance. If the operating lever Hc is further rotated in the tightening direction after the adjustment, the support shaft 76 can be secured in a desired orientation with respect to the main unit 30, and the viewfinder unit 70 can be secured at a desired distance from the support shaft 343 of the main unit 30.

In a case where the support shaft 76 is a cylinder, when the support shaft 76 is inserted into the shaft supporting portion Ha of the second holding portion 772, the viewfinder unit 70 might rotate about the support shaft 76. If the viewfinder unit 70 rotates in such a case, a difference is caused between the horizontal direction of the main unit 30 and the horizontal direction of the viewfinder unit 70, for example. In view of this, the viewfinder holding unit 75 may include a posture maintaining mechanism that keeps the horizontal directions of the main unit 30 and the viewfinder unit 70 the same as each other when the distance from the support shaft 343 to the viewfinder unit 70 is adjusted. For example, a convex portion that extends in the axial direction is formed on the side surface of the support shaft 76. A concave portion is formed in the shaft supporting portion Ha of the second holding portion 772 at the location that corresponds to the location of the convex portion of the support shaft 76 when the horizontal directions of the main unit 30 and the viewfinder unit 70 are the same. In this arrangement, even if the support shaft 76 is moved in the directions of the arrows FE with respect to the second holding portion 772 so as to adjust the distance from the support shaft 343 to the viewfinder unit 70, the horizontal directions of the main unit 30 and the viewfinder unit 70 can be kept the same as each other. Also, in a case where the support shaft 76 is elliptical or polygonal in cross-section, and the shaft supporting portion Ha of the second holding portion 772 has a corresponding shape, the horizontal directions of the main unit 30 and the viewfinder unit 70 can be kept the same as each other, for example, even when the support shaft 76 is moved in the directions of the arrows FE with respect to the second holding portion 772.

<4. Usage of the Imaging Apparatus>

Figure 14:
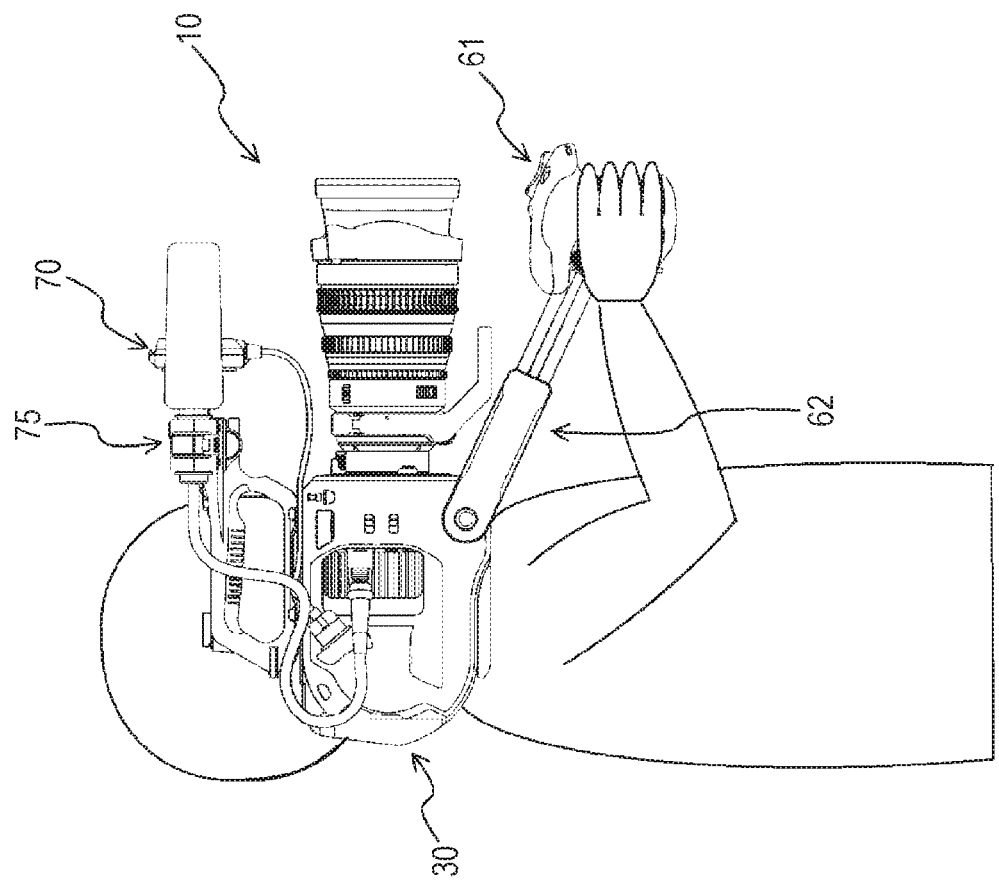
FIG. 14 shows an example type of usage where the imaging apparatus is carried on a shoulder at the time of imaging.

Next, usage of the imaging apparatus 10 having the above described structure is described. FIG. 14 shows an example type of usage where the imaging apparatus 10 is carried on a shoulder at the time of imaging. In the case where the imaging apparatus 10 is carried on a shoulder at the time of imaging, the arm unit 62 is stretched forward and is secured therein. The grip main unit 61 is secured in a position that matches the position of the hand in the case where the imaging apparatus 10 is used while being carried on a shoulder. Further, the viewfinder unit 70 is secured in an optimum position while the imaging apparatus 10 is carried on a shoulder. In this manner, the grip main unit 61 and the viewfinder unit 70 are located in optimum positions when the imaging apparatus 10 is used while being carried on a shoulder. Thus, operability is increased, and stable imaging can be readily performed.

Figure 15:
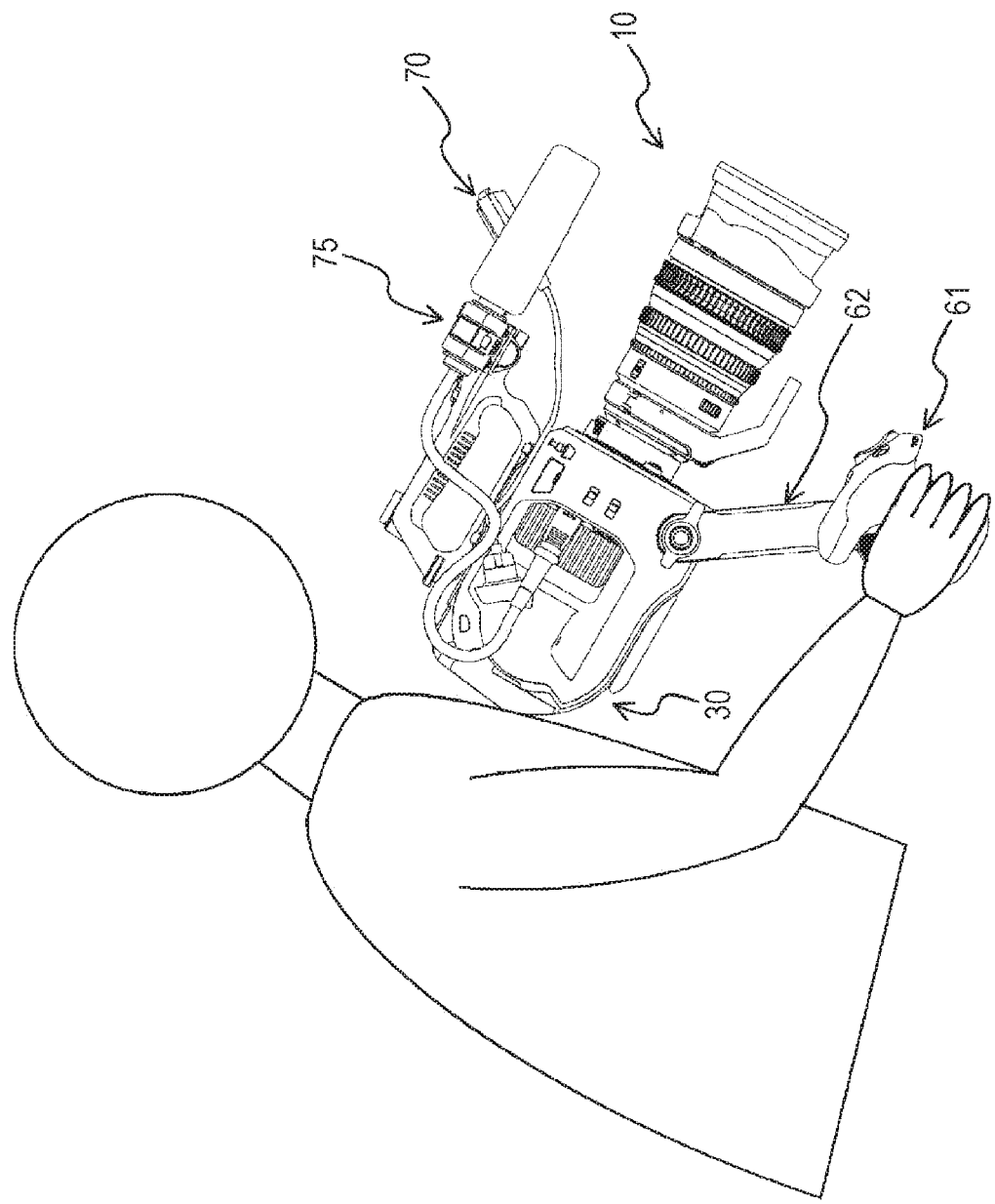
FIG. 15 shows an example type of usage where the imaging apparatus is held against the chest of a user during an imaging operation.

FIG. 15 shows an example type of usage where the imaging apparatus 10 is held against the chest of a user during an imaging operation. In this case, the arm unit 62 is retracted while facing forward, and is secured therein. The grip main unit 61 is secured in a position that matches the position of the hand in the case where the imaging apparatus 10 is used while being held against the chest of the user. Further, the viewfinder unit 70 is secured in an optimum position while the imaging apparatus 10 is held against the chest of the user. In this manner, the grip main unit 61 and the viewfinder unit 70 are located in optimum positions when the imaging apparatus 10 is used while being held against the chest of the user. Thus, operability is increased, and stable imaging can be readily performed.

As described above, the imaging apparatus 10 includes: the grip main unit 61 to be gripped by the user; and the arm unit 62 that includes the first attaching portion formed at one end thereof and the second attaching portion formed at the other end thereof, the grip main unit 61 being attached to the first attaching portion, the second attaching portion being attached to the main unit 30. Also, the arm unit 62 is attached in such a manner that the position of the grip main unit 61 with respect to the main unit 30 can be moved about the second attaching portion, and the grip main unit 61 is attached in such a manner that the orientation thereof with respect to the main unit 30 can be moved about the first attaching portion of the arm unit 62. Accordingly, stable imaging can be readily performed, regardless of types of usage.

In a case where the main unit 30 is housed in a casing or the like, the arm unit 62 is retracted while facing backward, so that the grip main unit 61 is overlapped on the main unit 30, though not shown in the drawings. In this manner, the main unit 30 can be made smaller in size even when the movable grip unit 60 is attached thereto, and accordingly, the main unit 30 can be easily carried around.

Figure 16:
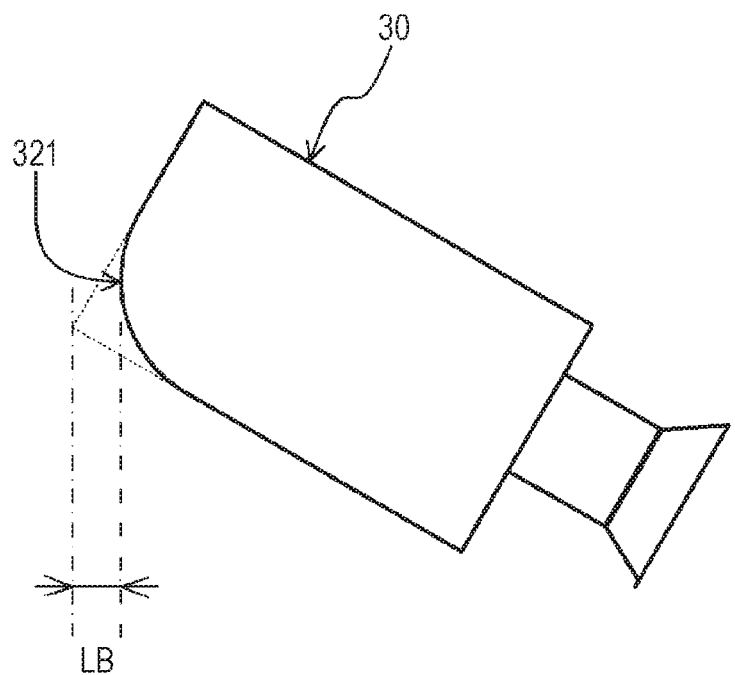
FIG. 16 is a diagram showing a model of the imaging apparatus facing obliquely downward.

Meanwhile, in a side view, a chamfered sloping portion is formed at a lower portion of the rear end of the main unit 30. Accordingly, when the imaging apparatus 10 is put on a shoulder or is put down from a shoulder, the lower portion of the rear end hardly touches the user's body, and operability can be increased. Furthermore, in a case where the imaging apparatus 10 faces obliquely downward to perform imaging, the protruding portion at the lower portion of the rear end is small as shown in FIG. 16. Accordingly, the imaging position can be moved back by a distance LB, compared with the imaging position of a conventional imaging apparatus (indicated by a dashed line) not having the chamfered sloping portion. In a case where the imaging apparatus 10 is used while being held against the chest of a user, the pressure from the lower portion of the rear end on the chest can be made weaker than that in a conventional imaging apparatus not having the chamfered sloping portion. In the above described embodiment, the chamfered sloping portion is formed so that the arc-like curved edge portion appears in a side view. However, the chamfered sloping portion may be designed to have a straight edge portion. The chamfered sloping portion may be designed to have such a shape that the backward protrusion at the lower portion of the rear end becomes smaller than a predetermined amount, or the angle of the portion to be in contact with the user becomes larger than a predetermined angle. In this manner, operability can be further increased.

The main unit has a cylindrical shape in the optical-axis direction of an imaging lens, having a side surface protruding outward. Accordingly, when the imaging apparatus is used while being held against the chest, it is easier to stabilize the imaging apparatus.

The advantageous effects described in this specification are merely examples, and the advantageous effects of the present technology are not limited to them and may include additional effects that are not described herein. It should also be noted that the present technology should not be interpreted to be limited to the above described embodiments. The embodiments of this technology disclose the present technology through examples, and it should be obvious that those skilled in the art can modify or replace those embodiments with other embodiments without departing from the scope of the technology. That is, the claims should be taken into account in understanding the subject matter of the present technology.

An imaging apparatus of the present technology can also be in the following forms.

(1) An imaging apparatus including:
a main unit including an imaging device and imaging lens;
a grip configured to be gripped by a user; and
an arm that includes a first attaching portion and a second attaching portion, the grip being attached to the first attaching portion,
and the second attaching portion being attached to the main unit of the imaging apparatus, wherein
a position of the grip is adjustable, with respect to the main unit, about the second attaching portion, and
an orientation of the grip is adjustable, with respect to the main unit, about the first attaching portion of the arm.

(2) The imaging apparatus of (1), wherein the arm is configured to be secured at at least one position with respect to the main unit, and the grip is configured to be secured at at least one position with respect to the arm.

(3) The imaging apparatus of (1) or (2), wherein the arm is configured to extend such that a distance between the first attaching portion and the second attaching portion is changed.

(4) The imaging apparatus of any of (1) through (3), wherein the arm is configured to rotate about the second attaching portion, and the rotation plane of the arm is substantially parallel to a side surface of the main unit.

(5) The imaging apparatus of any of (1) through (4), further including an input device configured to be operated by the user and that is formed on the grip.

(6) The imaging apparatus of (5), wherein the input device includes at least one of a fixed-function switch and a variable-function switch.

(7) The imaging apparatus of (5) or (6), wherein the input device includes at least one of a switch that issues an instruction to adjust a focal length or a switch that issues an instruction to start or end recording.

(8) The imaging apparatus of any of (1) through (7), wherein a chamfered sloping portion is formed at a lower portion of a rear end of the main unit in a side view.

(9) The imaging apparatus of (8), wherein the chamfered sloping portion is formed to have an arc-like curved edge portion in the side view.

(10) The imaging apparatus of any of (1) through (9), wherein the main unit has a cylindrical shape in the optical-axis direction of the imaging lens, having a side surface protruding outward.

(11) The imaging apparatus of any of (1) through (10), further including:
a viewfinder; and
a viewfinder holder configured to hold the viewfinder,
wherein the viewfinder is rotatable about a support shaft protruding in a horizontal direction from the main unit, and a distance from the support shaft to the viewfinder is adjustable.

(12) The imaging apparatus of (11), wherein the viewfinder holder includes a posture maintaining mechanism that is configured to keep the main unit and the viewfinder at the same horizontal direction when the distance from the support shaft to the viewfinder is adjusted.

(13) The imaging apparatus of any of (1) through (12), wherein the grip and the arm are configured to be moved or secured in accordance with different types of usage of the imaging apparatus.

[14] The imaging apparatus of any of (1) through (13), further including a shoulder pad attached to a bottom surface of the main unit.

[15] A supporting assembly including
a grip configured to be gripped by a user; and
an arm including a first attaching portion and a second attaching portion, the grip being attached to the first attaching portion,
and the second attaching portion being configured to attach to an apparatus, wherein
a position of the grip is adjustable, with respect to the apparatus, about the second attaching portion, and
an orientation of the grip is adjustable, with respect to the apparatus, about the first attaching portion of the arm.

INDUSTRIAL APPLICABILITY

An imaging apparatus according to this technology includes: a main unit including an imaging device and imaging lens; a grip configured to be gripped by a user, and an arm that includes a first attaching portion and a second attaching portion, the grip being attached to the first attaching portion, and the second attaching portion being attached to the main unit of the imaging apparatus. Also, a position of the grip is adjustable, with respect to the main unit, about the second attaching portion, and an orientation of the grip is adjustable, with respect to the main unit, about the first attaching portion of the arm. A supporting assembly according to this technology includes: a grip configured to be gripped by a user, and an arm that includes a first attaching portion and a second attaching portion, the grip being attached to the first attaching portion, and the second attaching portion being attached to an apparatus. Also, a position of the grip is adjustable, with respect to the apparatus, about the second attaching portion, and an orientation of the grip is adjustable, with respect to the apparatus, about the first attaching portion of the arm. Accordingly, stable imaging can be readily performed, regardless of types of usage. The present technology is suited for video cameras for professional use, for example.

REFERENCE SIGNS LIST

10 Imaging apparatus
20 Lens unit
30 Main unit
60 Movable grip unit
61 Grip main unit
62 Arm unit
62B Second attaching portion
62G First attaching portion
70 Viewfinder unit
71, 77 Clamp portion
75 Viewfinder holding unit
76, 343 Support shaft
321 Chamfered sloping portion
341 Handle unit
342 Microphone attaching portion
351, 611 Operating unit
365 Securing lever
612 Zoom switch
613 REC button
614 Assignable button 615 Setting button
616 Jog dial
621 Rod
621d Long hole
622 Rod holding portion
623 Locking pin

The invention claimed is:
1. An imaging apparatus, comprising:
a main unit that includes an imaging device and an imaging lens;
a user-holdable grip;
a viewfinder attached to a first side surface of the main unit;
an arm that includes a first attaching portion at a first end of the arm, a second attaching portion at a second end of the arm, a rod, and a rod holding portion, wherein
the arm is attached to a second side surface of the main unit which is opposite to the first side surface of the main unit,
the rod holding portion engages with the rod in a slidable manner,
the rod is configured to slide along the rod holding portion to extend the arm such that a distance between the first attaching portion and the second attaching portion is changed;
a first lever on the arm, wherein
the first lever is configured to control a movement of the user-holdable grip with respect to the main unit,
the user-holdable grip is attached to the first attaching portion,
the second attaching portion is attached to the second side surface of the main unit of the imaging apparatus, and
a position of the user-holdable grip is adjustable with respect to the main unit; and
a user-operable input device on a surface of the user-holdable grip, wherein
the user-operable input device includes a first switch configured to unlock the user-holdable grip.

2. The imaging apparatus according to claim 1, wherein the arm is configured to secure at least first position with respect to the main unit, and
the user-holdable grip is configured to secure at least second position with respect to the arm.

3. The imaging apparatus according to claim 1, wherein the arm is configured to rotate about the second attaching portion, and
a rotation plane of the arm is parallel to the second side surface of the main unit.

4. The imaging apparatus according to claim 1, wherein the user-operable input device includes at least one of a fixed-function switch or a variable-function switch, and
the first switch is the fixed-function switch.

5. The imaging apparatus according to claim 1, wherein the user-operable input device further includes at least one of
a second switch configured to:
transmit a first instruction to a control unit; and
adjust a focal length based on the transmitted first instruction, or
a third switch configured to:
transmit a second instruction to the control unit; and
one of start or end recordation based on the transmitted second instruction.

6. The imaging apparatus according to claim 1, further comprising a chamfered sloping portion at a rear end of the main unit in a side view.

7. The imaging apparatus according to claim 6, wherein the chamfered sloping portion is an arc-like curved edge portion in the side view.

8. The imaging apparatus according to claim 1, wherein the main unit has a cylindrical shape in an optical-axis direction of the imaging lens, and
the main unit has the second side surface that is protruded outward.

9. The imaging apparatus according to claim 1, further comprising
a viewfinder holder configured to hold the viewfinder, wherein
the viewfinder holder comprises:
a clamp portion that includes:
a first holding portion configured to hold a first support shaft that protrudes in a horizontal direction from the main unit; and
a second holding portion configured to hold a second support shaft in a direction perpendicular to the first support shaft; and
a second lever that is inserted into a tightening portion of the first holding portion that overlaps with a tightening portion of the second holding portion, wherein the second lever is configured to adjust a distance between the second support shaft and the viewfinder, and
the viewfinder is rotatable about the first support shaft.

10. The imaging apparatus according to claim 9, wherein the viewfinder holder includes a posture maintaining mechanism configured to keep the main unit and the viewfinder at the horizontal direction based on an adjustment of the distance between the second support shaft and the viewfinder.

11. The imaging apparatus according to claim 1, wherein the user-holdable grip and the arm are configured to one of move or secure based on different types of usage of the imaging apparatus.

12. The imaging apparatus according to claim 1, further comprising a shoulder pad attached to a bottom surface of the main unit.

13. A supporting assembly, comprising:
a user-holdable grip;
an arm that includes a first attaching portion at a first end of the arm, a second attaching portion at a second end of the arm, a rod, and a rod holding portion, wherein
the arm is attached to a second side surface of a main unit which is opposite to a first side surface of the main unit,
the rod holding portion engages with the rod in a slidable manner,
the rod is configured to slide along the rod holding portion to extend the arm such that a distance between the first attaching portion and the second attaching portion is changed,
a viewfinder is attached to the first side surface of the main unit;
a lever on the arm, wherein
the lever is configured to control a movement of the user-holdable grip with respect to the main unit,
the user-holdable grip is attached to the first attaching portion,
the second attaching portion is attached to the second side surface of the main unit, and
a position of the user-holdable grip is adjustable with respect to the main unit; and
a user-operable input device on a surface of the user-holdable grip, wherein the user-operable input device includes a button configured to unlock the user-holdable grip.

* * * * *